United States Patent [19]
Gaynor

[11] Patent Number: 5,003,328
[45] Date of Patent: Mar. 26, 1991

[54] PHOTOGRAPHIC TRIPOD APPARATUS

[76] Inventor: Tyrone L. Gaynor, 3437 Burke Dr., N., Philadelphia, Pa. 19145

[21] Appl. No.: 527,850

[22] Filed: May 24, 1990

[51] Int. Cl.$^5$ .................... G03B 29/00; A47B 91/00
[52] U.S. Cl. .................................. 354/81; 354/293; 248/188.8; 248/169
[58] Field of Search ................. 354/81, 293; 248/168, 248/169, 188.8, 188.9; 24/271

[56] References Cited
U.S. PATENT DOCUMENTS

| | | | |
|---|---|---|---|
| 2,927,927 | 10/1942 | Whitman | 248/171 |
| 3,441,987 | 5/1969 | Cregier | 24/271 |
| 4,691,610 | 9/1987 | Gilbert | 248/168 |

Primary Examiner—L. T. Hix
Assistant Examiner—Cassandra C. Spyron
Attorney, Agent, or Firm—Leon Gilden

[57] ABSTRACT

An apparatus including a plurality of legs pivotally mounted to a base for support of photographic equipment thereon. The legs each include three telescoping members, wherein a cylindrical sleeve receives a lower terminal end of each of the legs, wherein the sleeve includes a bore to receive the leg therein, and further includes a plurality of support feet mounted to a lower terminal end of each cylindrical sleeve in a pivotal relationship and arranged to provide support for the sleeve and each of the tripod legs, wherein each of the feet are interfolded to provide a convenient compact organization for storage and transport.

1 Claim, 4 Drawing Sheets

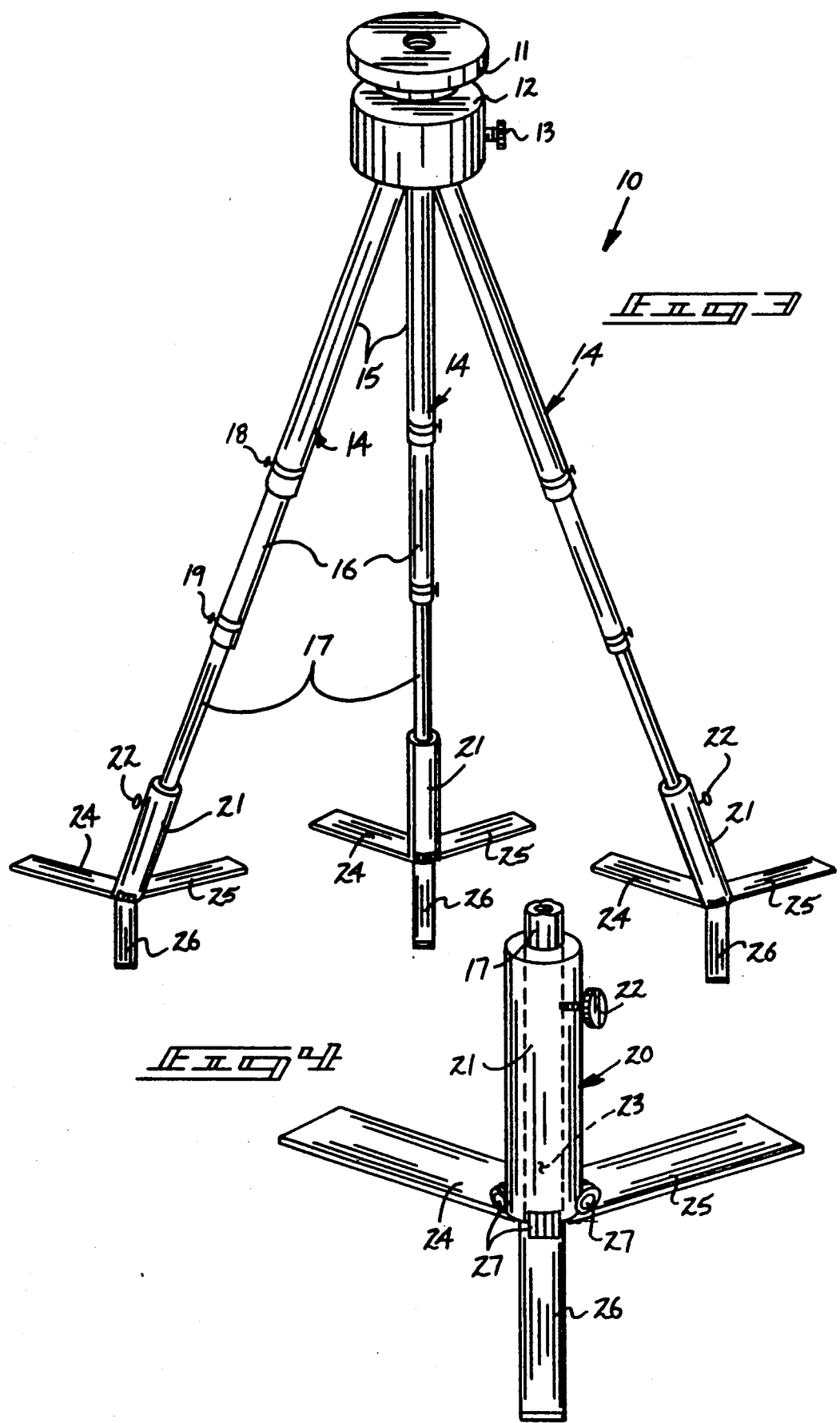

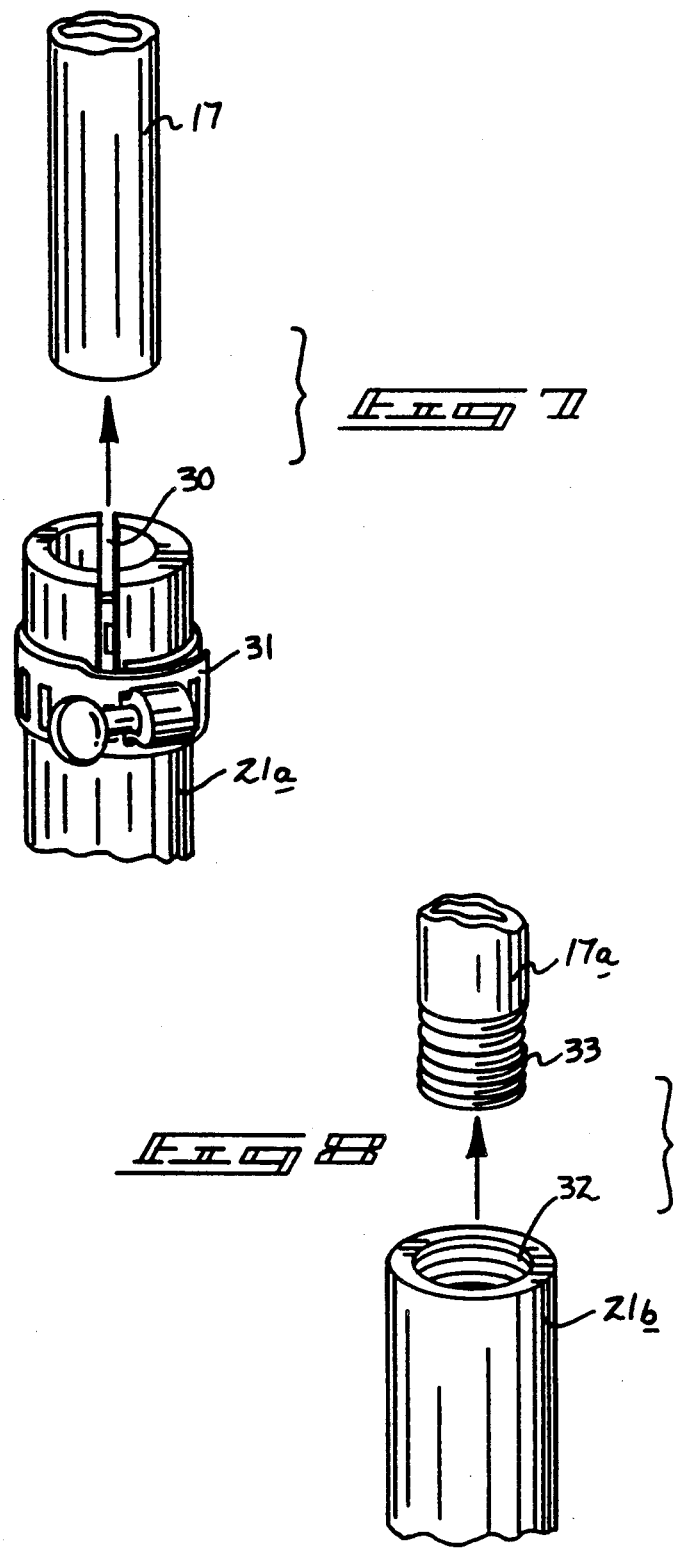

PHOTOGRAPHIC TRIPOD APPARATUS

BACKGROUND OF THE INVENTION

1. Field of the Invention

The field of invention relates to photographic equipment, and more particularly pertains to a new and improved photographic tripod apparatus wherein the same utilizes support mounts mounted at lower terminal ends of each tripod leg to effect stability and accommodation of various ground contours by the apparatus.

2. Description of the Prior Art

Tripod apparatus has been utilized extensively throughout the prior art to provide stability for various photographic equipment mounted thereon. The instant invention attempts to overcome deficiencies of the prior art by providing support sleeves mounted to lower terminal ends of the tripod apparatus to enhance stability of the apparatus in accommodating various ground contours and awkward photographic equipment. Examples of prior art devices include U.S. Pat. No. 4,324,477 to Mijazaki wherein a tripod apparatus utilizes a central post, with each of the legs mounted to the central post to effect stability of the legs in an extended orientation.

U.S. Pat. No. 4,309,099 to Flint sets forth a photographic camera support apparatus utilizing a bipod arrangement wherein one of said legs includes a transverse support member to effect stability of the apparatus.

U.S. Pat. No. 4,174,900 to Ina sets forth a tripod wherein each of the legs includes a "U" shaped cross-section to effect stability and fixed relationship of each of the legs relative to one another.

U.S. Pat. No. 4,666,112 to Jaumann sets forth a tripod wherein each of the legs are pivotally mounted to a carrier or upper support mount, with each of the legs including clamping members to position the legs in an extended orientation.

U.S. Pat. No. 4,648,698 to Iwasaki sets forth a tripod including a trio of legs pivotally mounted to a central axle of a camera mounting apparatus.

As such, it may be appreciated that there continues to be a need for a new and improved photographic tripod apparatus wherein the same addresses the problems of ease of use, as well as effectiveness in construction in permitting stability during use and ease of transport during collapse of the organization.

SUMMARY OF THE INVENTION

In view of the foregoing disadvantages inherent in the known types of photographic tripod apparatus now present in the prior art, the present invention provides a photographic tripod apparatus wherein the same includes sleeves mounted to lower terminal ends of each leg to secure the sleeves to the legs, and including support feet mounted on each of the sleeves to enhance stability of the organization accommodating various ground contours and bulky or expansive photographic equipment on the tripod apparatus. As such, the general purpose of the present invention, which will be described subsequently in greater detail, is to provide a new and improved photographic tripod apparatus which has all the advantages of the prior art photographic tripod apparatus and none of the disadvantages.

To attain this, the present invention provides an apparatus including a plurality of legs pivotally mounted to a base for support of photographic equipment thereon. The legs each include three telescoping members, wherein a cylindrical sleeve receives a lower terminal end of each of the legs, wherein the sleeve includes a bore to receive the leg therein, and further includes a plurality of support feet mounted to a lower terminal end of each cylindrical sleeve in a pivotal relationship and arranged to provide support for the sleeve and each of the tripod legs, wherein each of the feet are interfolded to provide a convenient compact organization for storage and transport.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved photographic tripod apparatus which has all the advantages of the prior art photographic tripod apparatus and none of the disadvantages.

It is another object of the present invention to provide a new and improved photographic tripod apparatus which may be easily and efficiently manufactured and marketed.

It is a further object of the present invention to provide a new and improved photographic tripod apparatus which is of a durable and reliable construction.

An even further object of the present invention is to provide a new and improved photographic tripod apparatus which is susceptible of a low cost of manufacture with regard to both materials and labor, and which accordingly is then susceptible of low prices of sale to the consuming public, thereby making such photographic tripod apparatus economically available to the buying public.

Still yet another object of the present invention is to provide a new and improved photographic tripod apparatus which provides in the apparatuses and methods of the prior art some of the advantages thereof, while simultaneously overcoming some of the disadvantages normally associated therewith.

Still another object of the present invention is to provide a new and improved photographic tripod apparatus wherein the same enhances stability to the apparatus during an operative use of the apparatus over various ground contours.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of the support sleeve utilized by the instant invention.

FIG. 7 is an isometric illustration of a modified support sleeve of the instant invention.

FIG. 8 is an isometric illustration of a further modified support sleeve of the instant invention.

DESCRIPTION OF THE PREFERRED EMBODIMENT

Figure 1:
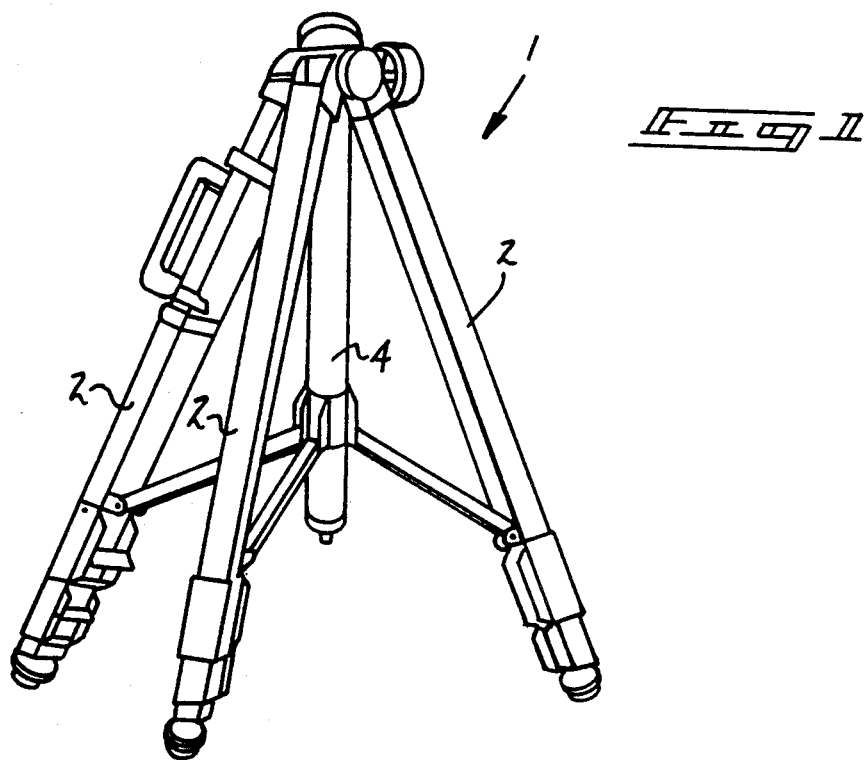
FIG. 1 is an isometric illustration of a prior art tripod apparatus.

With reference now to the drawings, and in particular to FIGS. 1 to 8 thereof, a new and improved photographic tripod apparatus embodying the principles and concepts of the present invention and generally designated by the reference numeral 10 will be described.

Figure 2:
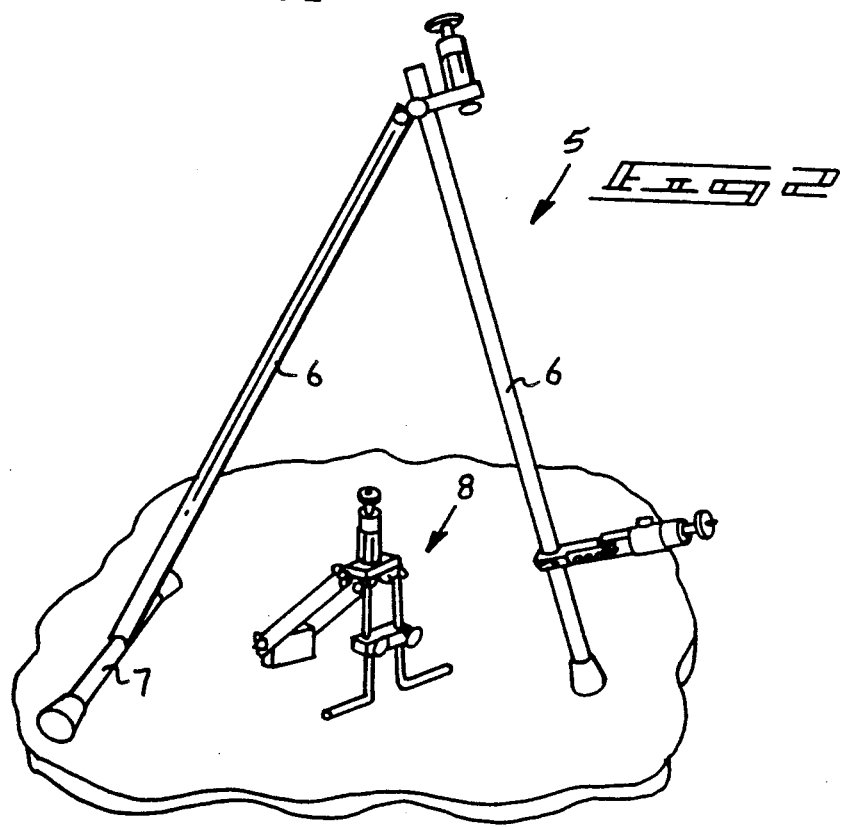
FIG. 2 is an isometric illustration of a further photographic support apparatus utilizing a bipod arrangement.

FIG. 1 illustrates a prior art tripod apparatus 1, including a series of three legs 2 mounted to an upper plate, with a central post 4, including linkage to stabilize the tripod legs relative to the central post. FIG. 2 illustrates a prior art bipod apparatus 5 utilizing spaced legs 6, where one of said legs includes a transverse leg 7 to effect stability to the organization. An additional bipod member 8 is utilized with the apparatus for use with close-up work in a photographic environment.

More specifically, the photographic tripod apparatus 10 of the instant invention essentially comprises a support mount 11 for supporting various photographic equipment such as cameras and the like thereon, with the mount 11 support by a base 12. The base 12 includes an adjustment screw 13 for pivotal securement of the mount 11 relative to the base 12. Three telescoping tripod legs 14 are pivotally mounted to a lowermost portion of the base 12. Each of the telescoping tripod legs each include a first leg member 15, a second leg member 16, and a third leg member 17, each respectively telescoped within a leg member utilizing a respective first and second threaded fastener directed through the first leg member 15 to secure the second leg member 16 telescopingly thereto, with a second threaded fastener 19 directed through the second leg member 16 to secure the third leg member 17 telescopingly thereto.

Figure 5:
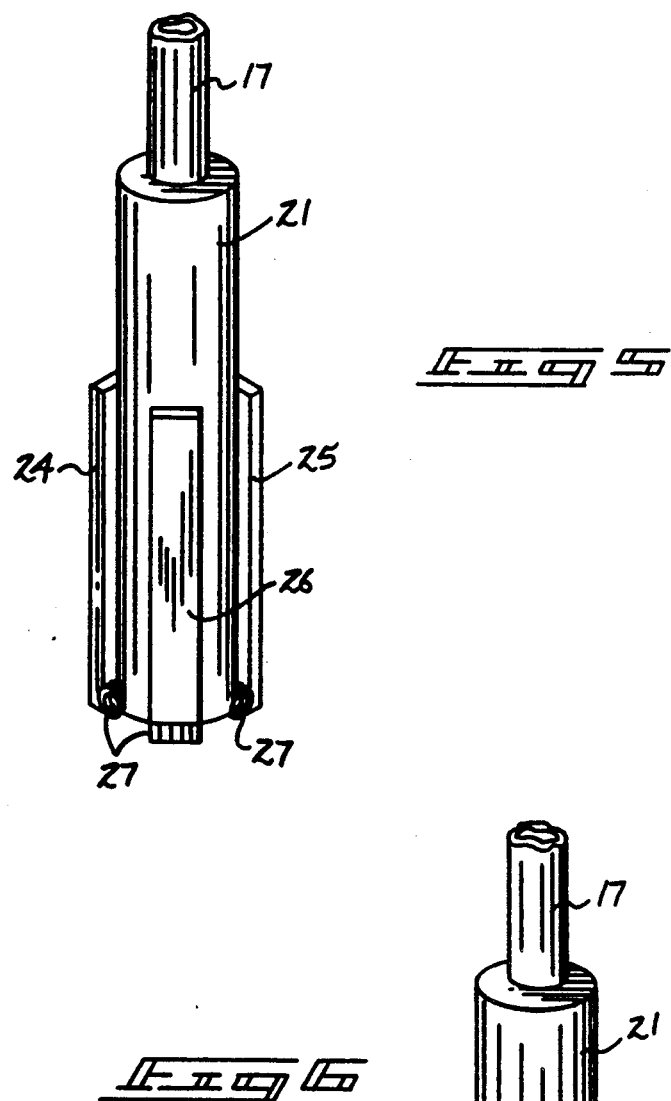
FIG. 5 is an isometric illustration of the support sleeve of the instant invention in an interfolded relationship.
Figure 6:
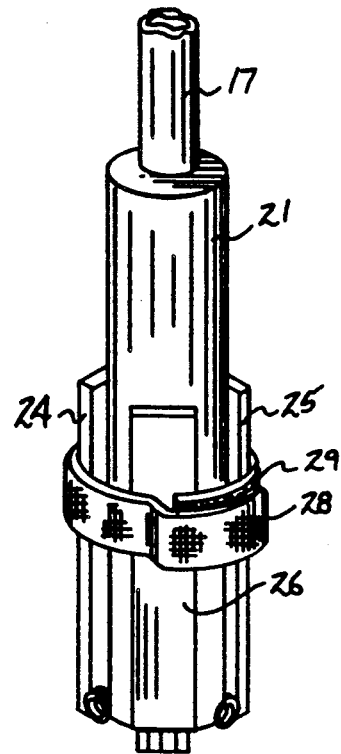
FIG. 6 is an isometric illustration of the support sleeve of the instant invention utilizing a securement strap thereabout.

A support base 20 receives a lower terminal portion of the third leg member 17 therewithin. The cylindrical sleeve 21 includes a securement member 22 threadedly directed through the cylindrical sleeve 21 to fixedly secure the lower portion of the third leg member 17 within a sleeve bore 23, wherein the sleeve bore 23 includes an internal diameter substantially equal to an external diameter defined by the third leg 17. A lower terminal end of the cylindrical sleeve 21 includes a trio of support feet, including a first, second, and third support foot 24, 25, and 26 utilizing ratcheting spring-type hinges 27 to pivotally mount the plate-like support feet 24, 25, and 26 relative to the lower terminal end of the sleeve 21 in alignment with the lower end surface of the sleeve 21 in an extended configuration, as illustrated. FIG. 5 illustrates the support feet in a second retracted position, wherein (see FIG. 6) a securement strap 28 is selectively utilized, wherein confronting hook and loop fastener surfaces 29 formed at opposed terminal end portions of the securement strap 28 enhance securement of the support feet in the retracted position for transport and storage of the organization.

FIG. 7 illustrates the use of a modified cylindrical sleeve 21 including a slotted upper end 30 defined by diametrically aligned slots to effect sliding reception of a lower terminal end of the third leg member 17 therewithin, including a clamp 31 to effect securement of the modified sleeve about the lower portion of the third leg member 17. FIG. 8 illustrates a further modified support sleeve 21b, wherein the modified support sleeve includes a threaded upper end 32 to receive a threaded lower end 33 of a modified third leg member 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A photographic tripod apparatus comprising,
   a support mount, the support mount positionably mounted to a support base, wherein the support base includes an adjustment member to adjust the support mount relative to the support base, and a first, second, and third telescoping leg mounted to the support base, each telescoping leg including a plurality of leg members telescopingly mounted relative to one another, and a support sleeve mounted to a lower terminal end of each telescoping leg, and wherein the support base includes a cylindrical sleeve, the cylindrical sleeve including a sleeve bore receiving the lower terminal end of the leg member therewithin, and the sleeve bore defined by an internal diameter, and the lower terminal end of the leg defined by an external diameter substantially equal to the internal diameter of the sleeve bore, and wherein each cylindrical sleeve includes a plurality of support feet pivotally mounted at a lower terminal end of each cylindrical sleeve, and wherein each of the support feet include a spring hinge to permit selective extension of the feet in a first extended position and retraction of the feet to a second position adjacent the cylindrical sleeve, and including a first, second, and third foot member mounted to each sleeve, each foot member configured as a plate, and including a securement strap selectively mounted about the support feet when the feet are in the retracted position, wherein the strap includes confronting hook and loop fastener surfaces mounted at confronting terminal ends of the strap to permit securement of the strap about the support feet, and including a fastener member to secure each sleeve to each tripod leg, and wherein the sleeve includes diametrically opposed slots formed at an upper terminal end of the sleeve, the slots including a clamp member surroundingly formed about the slots, and the clamp member arranged to effect securement of the lower terminal end of each tripod leg within each leg.

* * * * *